March 17, 1925.　　　　　　　　　　　　　　　　　1,529,903
J. J. MOJONNIER ET AL
CLUTCH
Original Filed July 13, 1922
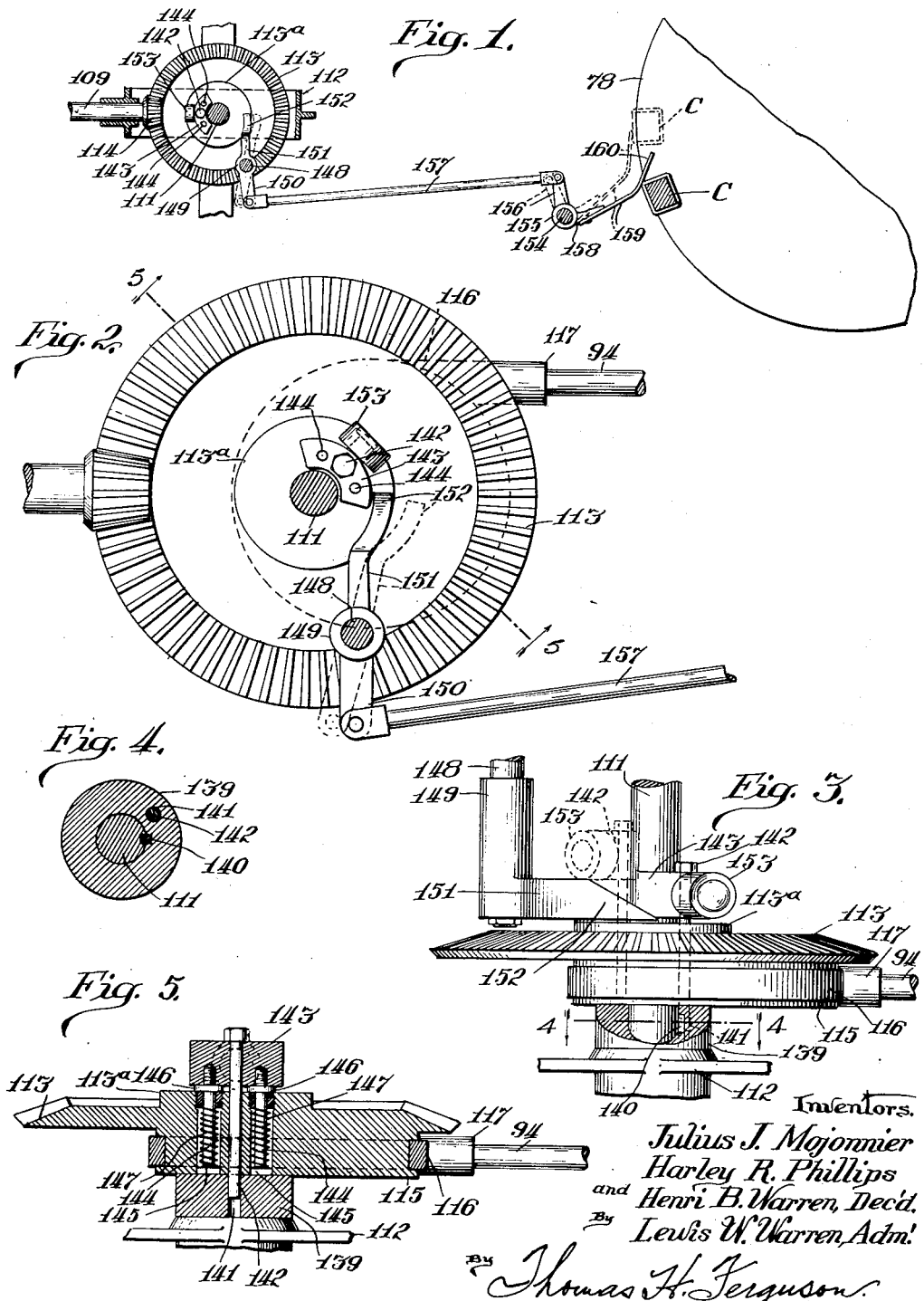

Patented Mar. 17, 1925.

1,529,903

UNITED STATES PATENT OFFICE.

JULIUS J. MOJONNIER AND HARLEY R. PHILLIPS, OF OAK PARK, AND HENRI B. WARREN, DECEASED, LATE OF OAK PARK, ILLINOIS; BY LEWIS W. WARREN, ADMINISTRATOR, OF OAK PARK, ILLINOIS, ASSIGNORS TO MOJONNIER BROS. CO., OF CHICAGO, ILLINOIS, A CORPORATION OF ILLINOIS.

CLUTCH.

Original application filed July 13, 1922, Serial No. 574,642. Divided and this application filed March 7, 1924. Serial No. 697,479.

*To all whom it may concern:*

Be it known that we, JULIUS J. MOJONNIER, HARLEY R. PHILLIPS, and HENRI B. WARREN, the latter deceased, LEWIS W. WARREN being the administrator of his estate, all citizens of the United States, and residents of Oak Park, in the county of Cook and State of Illinois, have invented certain new and useful Improvements in Clutches, of which the following is a specification.

This invention relates to clutches generally and the particular form of the invention disclosed herein was devised for use in an ice cream packaging machine. The principal object of the invention is to provide a clutch which will work efficiently in a packaging machine of the class mentioned. The invention consists in the construction, combination and arrangement of parts as hereinafter fully described and claimed and as fully illustrated in the accompanying drawings wherein:—

Fig. 1 is a plan view of a clutch and control constructed and arranged in accordance with the present invention.

Fig. 2 is an enlarged plan view of a portion of the same, illustrating more particularly the clutch.

Fig. 3 is a side elevation of the clutch of Fig. 2 with parts broken away.

Fig. 4 is a horizontal section showing the clutch pin in clutching position, the plane of section being indicated by the line 4—4 of Fig. 3.

Fig. 5 is a vertical section of the same, the plane of section being indicated by the line 5—5 of Fig. 2.

Throughout these views like characters refer to like parts.

The present application is a division of our prior application Serial No. 574,642, filed June 13, 1922, Patent No. 1,502,314, dated July 22, 1924.

Referring to the drawing in detail, 113 designates a constantly rotating gear wheel which is driven through a beveled pinion 114 on the drive shaft 109 which, in turn, is constantly driven from some suitable source of power. The wheel 113 is loosely mounted upon the shaft 111 and the latter is suitably mounted in a yoke 112 of the machine. In the operation of the packaging machine it is necessary to drive the shaft 111 at intervals from the wheel 113. This is accomplished by a clutch interposed between the wheel 113 and the shaft 111 which is under the control of cartons or containers C upon a rotating table 78. The latter is advanced by ratchet mechanism (not shown) operated from an eccentric formed integrally with the gear wheel 113 on its under face. The eccentric 115 is encircled by an eccentric band 116 attached to the ratchet operating rod 94 by a socket 117. The clutch collar 139 is fixed to the shaft 111 by the key 140, and is located directly below the gear wheel 113, the eccentric 115 of said gear wheel operating flush against the upper face of said collar. Between the shaft 111 and the periphery of the clutch collar 139 is a clutch pin socket or passage 141 into which a clutch pin 142 carried by the gear wheel 113 is adapted to drop when aligned therewith. Mounted on the upper face of the hub 113ª of the gear wheel 113 is a clutch block 143 curved to conform to the contour of the shaft and periphery of the hub 113ª and held for movement away from said gear by the guide pins 144 reciprocatingly secured in the pockets 145 formed in the hub 113ª parallel to the shaft 111. The upper ends of these pockets 145 are closed by the nuts 146 (see Fig. 5) threaded into the upper ends thereof, and through which the guide pins 144 reciprocate. To normally retain the block 143 substantially flush against the upper face of the hub 113ª and hence project the clutch pin 142 into the clutch pin socket 141 of the collar 139, the pins 144 are surrounded by the retractile springs 147 bearing against the nuts 146 at their upper ends and secured to the terminals of the pins at their lower ends. Hence any movement of the block 143 away from the hub 113ª will be against the action of the springs 147 and these springs will pull the block toward the gear wheel 113 when the block is released for such movement. Above the gear wheel 113 a fixed portion of the machine supports a depending trunnion 148 on which is loosely mounted a sleeve 149 having an operating stud 150 on one side thereof and a diametrically disposed finger 151 on the other side, the former providing a means for oscillating the sleeve 149 on the stud 148 to swing the finger 151 toward and away from the shaft 111. The free end 152 of the finger 151 is curved to follow the circumference of the gear wheel hub 113ª and is beveled on its upper edge (see Fig. 3) to operate under a roller 153 projecting outwardly from the center of the clutch block 143. When the sleeve 149 is uninfluenced, the beveled end 152 of the finger 151 rests in the path of the roller 153 as it is carried by the gear wheel 113 during its rotation, and when the roller contacts with the beveled end 152 it travels up the incline thereof, thus lifting the clutch block 143 and so positioning and holding the clutch pin 142 that it will not enter the socket 141 of the collar 139, and the roller 153 rides on the finger 151 until the pin 142 has passed the socket 141 when it is released to allow the springs 147 to act. Hence, it is clear that shaft 111 remains stationary as long as the finger terminal 152 lies in the path of the roller 153 and this is its normal position.

The sleeve 149 is oscillated successively by the cartons or containers C to swing the finger terminal 152 from the path of movement of the roller 153 whenever a carton or container is in receiving position, and thus the elements of the machine operated from the shaft 111 are entirely inoperative unless a carton or container C is in receiving position. For this purpose a trunnion 154 is suspended from a fixed portion of the machine frame adjacent to the edge of the table 78 and has a sleeve 155 loosely mounted thereon which carries a stud 156 connected by the pitman 157 to the operating stud 150 so that as the sleeve 155 is oscillated the sleeve 149 will be similarly moved. A lug 158 carrying a spring arm 159 extends from the sleeve 155 at right angles to the stud 156, the terminal 160 of said arm 159 being bent in the direction of travel of the cartons and in the path thereof. When a carton or container C contacts with the terminal 160 of the arm 159 the latter is moved to the dotted line position of Fig. 1 and swings the finger 151 out of the path of the roller 153, allowing the gear wheel 113 to operate the shaft 111 through the clutch pin 142. In the event no carton or container C contacts with the arm 159 the machine elements operated by the shaft 111 remain passive, the roller 153 riding upon the beveled end 152 of the finger 151, lifting the pin 142 from its socket 141.

What we claim and desire to secure by Letters Patent of the United States is:

1. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, and a control for said block to hold it against projecting the clutch pin into the clutch pin socket.

2. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a control for said block to hold it against projecting the clutch pin into the clutch pin socket, and means for moving said control to allow said projection.

3. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, and means co-operating with said roller to hold the block from projecting the clutch pin into its socket.

4. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, and means co-operating with said roller to hold the block from projecting the clutch pin into its socket during a portion of the rotation of the gear aforesaid.

5. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, and means co-operating with said roller to hold the block from projecting the clutch pin into its socket during that portion of the rotation of the gear that the clutch pin is aligned with its socket.

6. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, means co-operating with said roller to withhold said block from projecting said clutch pin into its socket, and means for moving said last said means to allow the pin to project into its socket.

7. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, and a tapered finger in the path of said roller to prevent the block from projecting said clutch pin into its socket.

8. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, a tapered finger in the path of movement of said roller to prevent the block from projecting the clutch pin into its socket, and means for moving the finger from the path of said roller.

9. The combination with a shaft, of a gear loosely mounted thereon, a clutch collar fixed to said shaft having a clutch pin socket therein, a clutch block movably carried by said gear, a clutch pin carried by said block, guide pins carried by said block and movable relatively to said gear, springs co-operating with said guide pins to normally move the block to project the clutch pin into the clutch pin socket, a roller projecting from said block, a tapered finger in the path of movement of said roller to prevent the block from projecting the clutch pin into its socket when the clutch pin is in alignment therewith, and means for moving the finger from the path of said roller.

In testimony whereof, we hereunto subscribe our names this 26 day of February, A. D. 1924.

JULIUS J. MOJONNIER.
HARLEY R. PHILLIPS.
LEWIS W. WARREN,
*Administrator of the estate of Henri B. Warren, deceased.*